March 30, 1965  J. W. NICHOL  3,175,866
METHOD AND APPARATUS FOR BLOWING INSULATION
Filed June 26, 1963  3 Sheets-Sheet 1

INVENTOR
JOHN W. NICHOL
BY
Dick, Zarley & Henderson
ATTORNEYS

March 30, 1965 J. W. NICHOL 3,175,866
METHOD AND APPARATUS FOR BLOWING INSULATION
Filed June 26, 1963 3 Sheets-Sheet 2

INVENTOR
JOHN W. NICHOL
BY
Dick, Zarley & Henderson
ATTORNEYS

March 30, 1965  J. W. NICHOL  3,175,866
METHOD AND APPARATUS FOR BLOWING INSULATION
Filed June 26, 1963  3 Sheets-Sheet 3
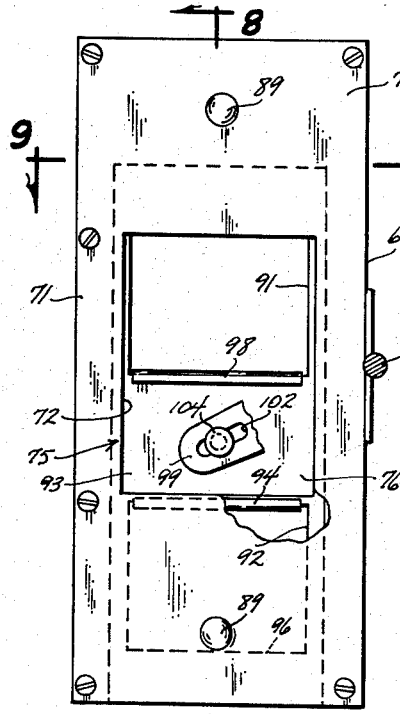
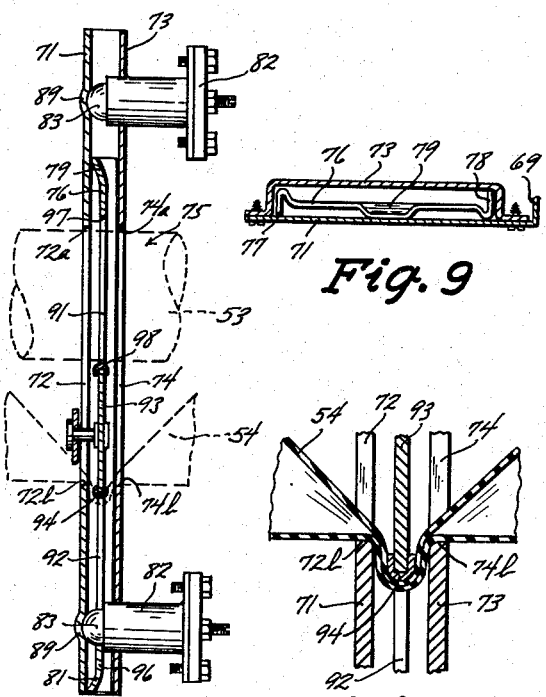
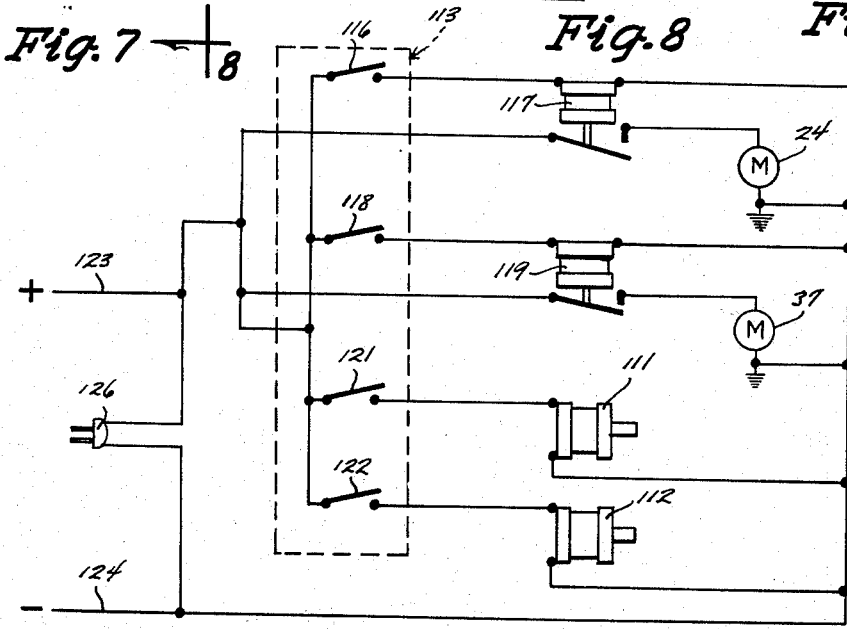
Fig. 7
Fig. 8
Fig. 9
Fig. 10
Fig. 11
INVENTOR
JOHN W. NICHOL
BY
Dick, Zarley & Henderson
ATTORNEYS United States Patent Office 3,175,866
Patented Mar. 30, 1965

3,175,866
METHOD AND APPARATUS FOR BLOWING INSULATION
John W. Nichol, 1511 6th Ave., Des Moines, Iowa
Filed June 26, 1963, Ser. No. 290,808
8 Claims. (Cl. 302—36)

This invention relates to the blowing of insulation and more particularly to a novel method and apparatus for blowing insulation from a hopper or the like to a point of use remote from the hopper.

Although the mechanical blowing of insulation from a hopper or the like to a remote place, such as an attic of a home, is old, one problem has continued to plague manufacturers and users of equipment in this field. At the remote end of the discharge tube, held by the user at the point of discharge, there are continual instances when the user desires to move the remote end from one point, or hole—so to speak—to another. During the time of movement, which may be from several seconds to a considerable length of time depending on the circumstances, the user does not want the insulation being discharged, nor does he want the insulation spilling or dribbling out of the discharge end.

Many methods and structures have been devised to prevent any spillage of the insulation during transfer from point to point. None of them have completely satisfied both the demand of effectiveness and economy, plus the capability of being readily operated by the operator.

It is therefore an object of this invention to provide a new and novel insulation blowing machine.

It is another object of this invention to provide a new and novel method of blowing insulation.

It is yet another object of this invention to provide a method of blowing insulation wherein by providing a back pressure within the discharge conduit when the end of the latter is blocked off from the atmosphere by blown insulation, discharge or dribbling out of insulation during movement of the conduit end is prevented, the conventional blower and hopper agitator motor both remaining running.

Still another object of this invention is to provide a machine for blowing insulation which includes apparatus, remotely controlled by the operator, on the machine for opening one end of a discharge conduit to the atmosphere when the other end is closed off, creating thereby a back pressure sufficient to reverse the normal flow of insulation in said conduit.

Another object of this invention is to provide in a machine for blowing insulation a flexible discharge conduit for the insulation, a flexible by-pass conduit, and means remotely operable to selectively maintain one conduit open and one closed to either discharge insulation to a point of use or to by-pass the insulation where none is discharged.

It is yet another object of this invention to provide a method and an apparatus capable of attaining the above designated objectives which method is simple, and once understood, readily obtained, and which apparatus is economical to manufacture, easy to maintain and service, and effective in operation.

These objects, and other features and advantages of this invention will become readily apparent from the following description when taken in conjunction with the accompanying drawings wherein:

FIG. 7 is an enlarged fragmentary side elevational view of a slide plate arrangement, certain parts broken away and others shown in dotted lines for illustrative clarity;

FIG. 8 is a sectional view taken along the line 8—8 in FIG. 7, a pair of flexible conduits being shown in dotted lines;

FIG. 9 is a sectional view taken along the line 9—9 in FIG. 7;

FIG. 10 is a fragmentary, enlarged view of a detail of FIG. 8;

FIG. 11 is a diagrammatic of the electric circuitry for the machine.

Figure 1:
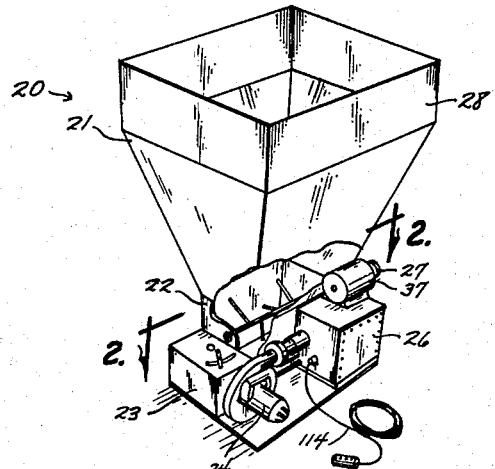
FIG. 1 is a perspective view of a insulation blowing machine showing a preferred embodiment of this invention.
Figure 3:
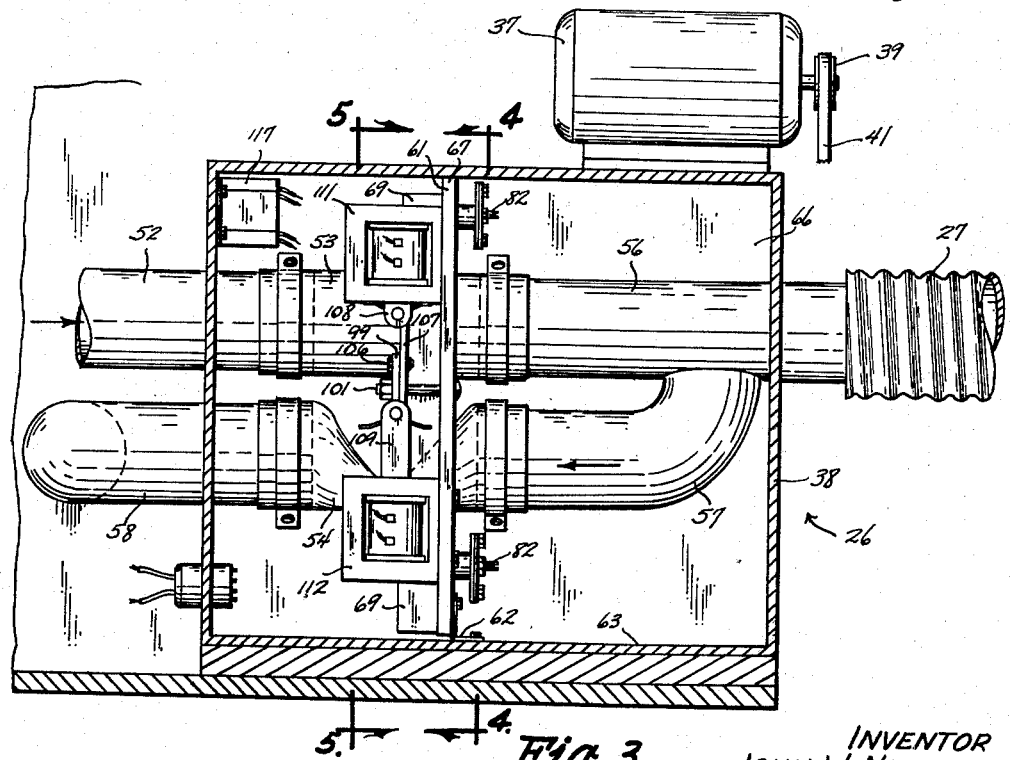
FIG. 3 is an enlarged, fragmentary, sectional view taken along the line 3—3 in FIG. 2, and showing the interior of the control unit housing.

Referring now to the drawings, the insulation blowing machine of this invention is indicated generally at 20 in FIG. 1. In general, the machine 20 comprises a hopper 21 supported on an agitator housing 22, a mixing chamber box 23, and a blower 24 for drawing insulation through the box 23 and for forcing it through a control unit 26 for discharge at the remote end (not shown) of a flexible conduit 27 (FIG. 3) of indeterminate length.

Figure 2:
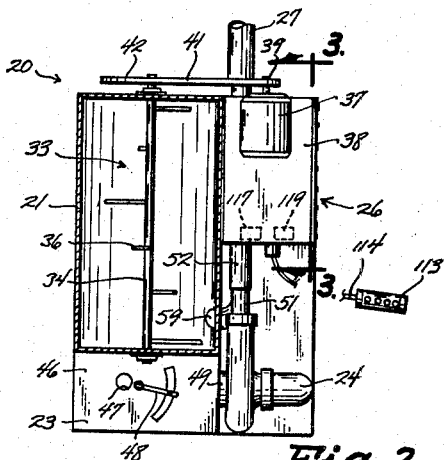
FIG. 2 is an enlarged sectional view taken along the line 2—2 in FIG. 1.
Figure 4:
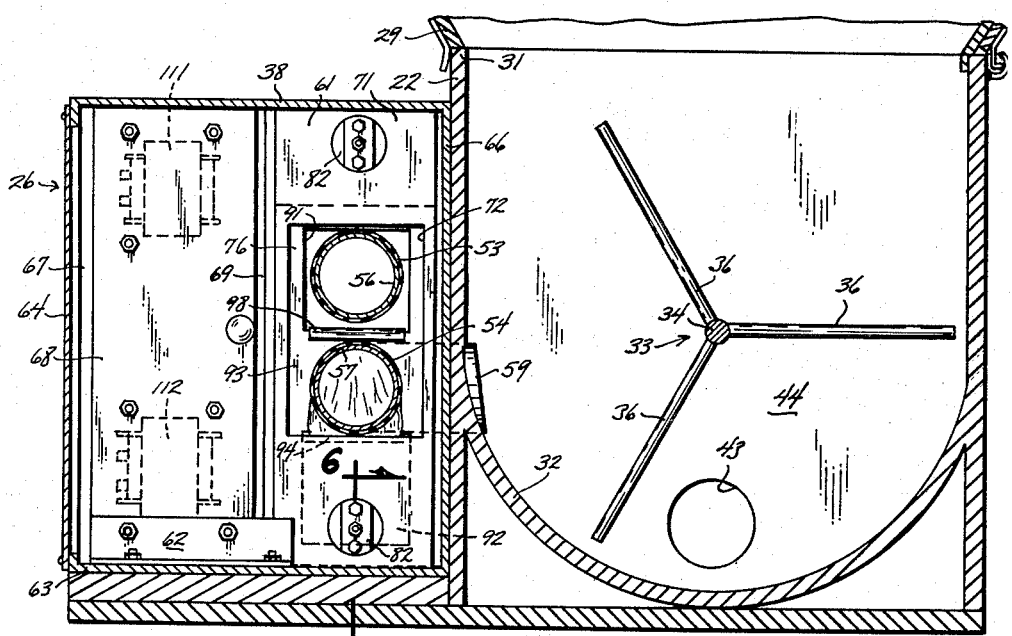
FIG. 4 is a sectional view taken along the line 4—4 in FIG. 3.

The hopper 21 has a right angular, open top 28 with the remainder tapering downwardly and inwardly until the base edge 29 (FIG. 4), defining the open bottom of the hopper 21, mates with the upper edge 31 of the agitator housing 22. The hopper 21 is hingedly connected with the agitator housing 22 so that it may be pivoted to open up the interior of the housing 22. The floor 32 of the housing 22 is curved to fit the peripheral arc of movement of an agitator 33 comprised of a shaft 34 and a series of radially extended arms 36 (FIGS. 2 and 4). Thus, upon placing a quantity of insulation (not shown) of a cellulose type, for example, adapted to be blown, into the hopper 21, rotation of the agitator 33 will maintain the insulation in a loose condition capable of being blown or moved by air. A motor 37 (FIGS. 1 and 3) is mounted on the control unit housing 38, and rotates a pulley 39 (FIG. 2) which via a belt 41 rotates another pulley 42 secured to the external end of the agitator shaft 34.

An opening 43 (FIG. 4) is formed in an end wall 44 of the agitator housing 22 and leads to the hollow interior of the mixing chamber box 23. Within the top 46 (FIG. 2) of the box 23, an air inlet opening 47 is also formed, the effective size of which is adjustable by means of a hand operated gate valve 48. At one end of the box 23, the blower 24 is secured with an intake tube 49 communicating with the interior of the mixing chamber box 23 and with an outlet tube 51 communicating with a transfer tube 52 leading into the control unit 26. The blower 24 is a commercially available electric type having a one horsepower motor and operating efficiently at approximately 11,750 r.p.m.

Upon operation thereof, the insulation is pulled from the agitator housing 22 through the opening 43 and into the mixing chamber box 23 where the insulation is mixed with a predetermined quantity of air, depending upon the adjusted size of the air inlet opening 47. The mixed insulation is then forced out through the blower 24 through the transfer tube 52.

Referring now primarily to FIGS. 3–10, the control unit 26 is structurally arranged to affect the condition of a pair of flexible conduits 53 and 54. Conduit 53 is part of the main discharge path of the insulation, interconnecting the transfer tube 52 to another transfer tube 56 (FIG. 3) to which the flexible conduit 27 is connected. The conduit 54 is part of a by-pass path for the insulation being forced outwardly by the blower 24, and interconnects a branch 57 off the tube 56 with an angular tube 58 which extends below the transfer tube 52 into communication with the interior of the agitator housing 22, the end 59 of the tube 58 being shown in FIG. 4.

To exercise the invention, the by-pass conduit 54 must be closed (FIG. 3) if the main conduit 53 is open, and when the main conduit 53 is closed, the by-pass conduit 54 is open. When the main conduit 53 is closed insulation cannot be forced therethrough to the conduit 27, even with the agitator motor 37 and the blower 24 operating. With the main conduit 53 closed, an effective air seal is provided, the only outlet between the blower 24 and the discharge end of the flexible conduit 27 being the by-pass conduit 54. And with the by-pass conduit 54 closed (FIG. 3), insulation is forced from the blower 24 completely through the flexible conduit 27.

To accomplish the process of exercising the invention, one embodiment includes a transverse, irregularly shaped plate 61 (FIGS. 3 and 4), supported by a bracket 62 (FIG. 3) on the floor 63 of the control unit housing 38 and extended between the side walls 64 and 66 (FIGS. 4 and 5) of the housing 38. The plate 61 includes an end flange 67 turned at right angles to a transverse outer flat portion 68 (FIGS. 4 and 5), a longitudinally extended middle flange 69 (FIGS. 5 and 9), and an inner flat portion 71 (FIGS. 4, 5 and 7) which has a rectangular opening 72 formed therein. A U-shaped plate 73 (FIGS. 8, 9 and 10) is secured to the portion 72 to form a horizontally spaced relation therebetween (see FIG. 8), and is also provided with a rectangular opening 74 horizontally aligned with the opening 72 to form a window 75 having upper edges 72a and 74a, and lower edges 72b and 74b (FIG. 10).

Inserted between the plate 73 and the portion 71 for vertically reciprocal movement is a slide 76 (FIG. 8). Referring to FIG. 9, the slide 76 has edges 77 and 78 extended reversely to each other and to the main plane of the slide 76, the edges permitting an easy but firm, as opposed to loose, movement of the slide. At each end of the slide 76 and centrally thereof, a lip 79 and 81 is formed for sliding engagement with a pair of ball locking devices 82 (FIGS. 8 and 6). Each device 82 comprises a ball 83 forced outwardly from a housing 84 by a spring 86 held therein, the compression of the spring 86 adjusted by a bolt 87 the shank of which is threaded through a plate 88 secured to the end of the housing 84. The latter is welded to the rear of the plate 73, with each ball 83 forced toward a slight depression 89 (FIGS. 5 and 6) formed in the portion 71.

The balls 83 are adapted to coact with the slide 76, in that a pair of vertically spaced, right angular passages 91 and 92 are formed in the slide 76, separated by a panel 93. Both passages 91 and 92 are of sufficient size that the conduits 53 and 54 will pass therethrough in their normal open condition. However, as best seen in FIGS. 7 and 8, the combined length of the passages 91, 92 and the panel 93 is considerably greater than the length of the window. Thus, when the upper passage 91 is horizontally aligned with the window 75 (FIGS. 7 and 8), the main conduit 53 extends therethrough in open condition, but the lower passage 92, through which the by-pass conduit 54 extends, is positioned below the lower edges 72b and 74b of the window 75; so that the by-pass conduit 54 is pinched closed in a V-shape (FIG. 10) by the beaded lower edge 94 of the panel 93. In this position of the slide 76, the lower ball 83 engages the slide 76 at the lower edge 96 thereof defining the lower passage 92.

To close the main conduit 53 while simultaneously opening the by-pass conduit 54, the slide is moved upwardly between the plate 73 and the inner portion 71, the upper lip 79 engaging and moving the upper ball 83 rearwardly within its housing 84 until the upper edge 97 of the upper passage 91 passes the ball 83 whereupon the ball pops out into the depression 89, locking the slide 76. In this position of the slide, the lower passage 92 is horizontally aligned with the window 75 so that the by-pass conduit 54 is in its normal open condition; and the upper passage 91, through which the main conduit 53 extends, is positioned slightly above the upper edges 72a and 74b, so that the main conduit 53 is pinched closed in an inverted V-shape by the beaded upper edge 98 of the panel 93.

In this position of the slide 76, the main conduit interconnecting the blower 24 with the flexible conduit 27 is closed off to the passage of insulation therethrough, such closing being substantially airtight, and the flexible conduit 27 is open to the atmosphere by the by-pass conduit 54.

To reciprocate the slide 76, a rocker arm 99 (FIGS. 3 and 5) is pivotally mounted on the end of a pivot pin 101 (FIGS. 3 and 7) secured to the flange 69 of the plate 61. Each end of the rocker arm 99 has an elongated slot 102 and 103 formed therein, with the inner slot 102 (FIGS. 7 and 8) having a pin 104 extended therethrough for connection to the slide 76. The outer slot 103 also has a pin 106 extended therethrough for connection to a link 107 (FIGS. 3 and 5) pivotally interconnected between the plungers 108 and 109 of a pair of single acting solenoids 111 and 112 of conventional make. The solenoids are mounted in vertically spaced relation on the outer portion 68 of the plate 61, and are arranged such that energization of either retracts its respective plunger, thus pulling the other plunger outwardly and pivoting the rocker arm 99 about its pivot 101.

The solenoids 111 and 112 are part, with the blower 24 and agitator motor 37, of the electric circuitry for the machine 10, best shown in FIG. 11. The machine 10 is controlled by a hand control 113 (FIG. 1, and shown in a dotted line box in FIG. 11) connected by a cord 114 to the control unit. Within the hand control 113 is an on-off switch 116 both sides of which are connected to a relay 117 in circuit with the blower motor 24. Another on-off switch 118, preferably a toggle switch for visible indication purposes, is connected for actuation to a relay 119 in circuit with the agitator motor 37. A pair of on-off switches 121 and 122 are also mounted within the hand control unit 113 for energizing the respective solenoids 111 and 112. The circuit is connected to a source of electric energy by a pair of lines 123 and 124, which may be controlled at the control unit 26 by a main switch (not shown), and an auxiliary plug 126 may be provided in the circuit.

In operation of the insulation blowing machine 20, assume the operator is in an upper area of a home for the purpose of filling the spaces between vertical studs with insulation. He has the remote end (not shown) of the flexible conduit 27 and the hand control unit 113 with him. The hopper 21 is filled with insulation. To start the agitator motor 37, he turns the switch 118 on. The switch 121 is turned on to actuate the solenoid 111 so that the rocker arm 99 is in the full line position of FIG. 5, with the main conduit 53 open and the by-pass conduit 54 closed. After placing the flexible conduit end inside the "hole" between the studs, the blower motor switch 116 is turned on.

The insulation is then agitated, drawn through the mixing chamber box 23 where it is mixed with a predetermined quantity of air, drawn into the blower 24 and forced outwardly to the flexible conduit 27 via the main conduit 53. When the hole is filled, the operator is in a position to see that the remote end is closed off from the atmosphere in that it is against a mass of the blown insulation thereby stopping insulation within the flexible conduit from discharging. At this moment, the operator turns the switch 122 on, the switch 121 having automatically turned off—both solenoid switches 121 and 122 being spring returned to an open position, whereby the rocker arm 99 is moved to the dotted line position of FIG. 5. The main conduit 53 is thereby closed and the by-pass conduit opened.

The effect of this operation is threefold. First, by virtue of the position of the remote end of the flexible conduit 27 against a mass of blown insulation it is closed off from the atmosphere. Secondly, the flexible conduit is closed at a point intermediate its length between the outlet tube 51 of the blower 24 and the remote end thereof, namely at the main conduit 53. Thirdly, the flexible conduit 27 is opened to the atmosphere at a point intermediate its closed remote end and its closed main conduit portion. This simultaneous arrangement of the structure results in an instantaneous back pressure being created within the opened portion of the flexible conduit, wherein the insulation within the flexible conduit 27 at the time the main conduit 53 is closed reverses its normal outward flow and tends to flow rearwardly or backwardly through the flexible conduit 27, the by-pass conduit 54, and back into the agitator housing 22. Thus, in this condition of the machine 20, the operator may freely move the remote end of the flexible conduit to another hole without any spillage of insulation, and with the agitator motor 37 and the blower 24 continuing to operate. Even though the remote end of the flexible conduit 27 is now open to the atmosphere, no movement of insulation occurs therein, for if any insulation does remain therein, the pressure is equalized and no movement will occur.

Figure 5:
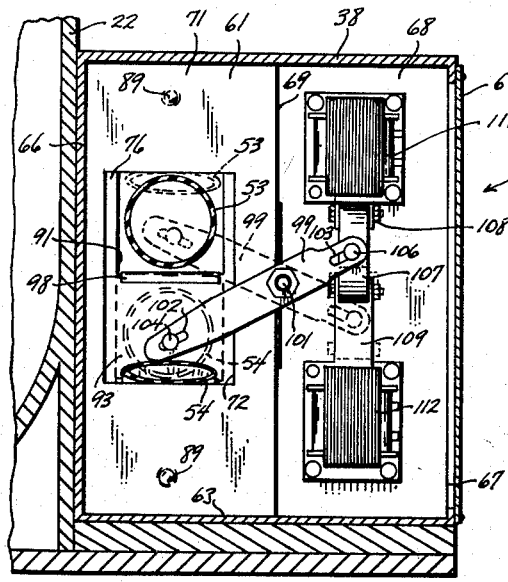
FIG. 5 is a sectional view taken along the line 5—5 in FIG. 4.
Figure 6:
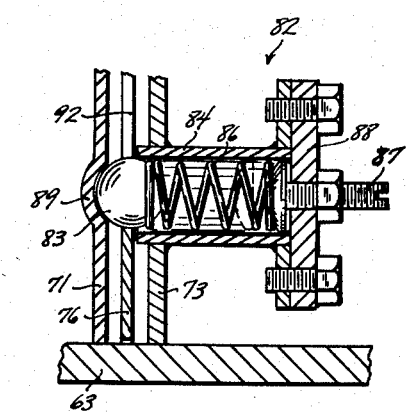
FIG. 6 is an enlarged sectional view taken along the line 6—6 in FIG. 4.

When the operator is ready to fill another hole, he merely closes the switch 121, energizing the solenoid 111 and pivoting, via the link 107 and plunger 108, the rocker arm 99 back to the solid line position of FIG. 5. The by-pass conduit 54 is then closed (FIG. 8) and the main conduit 53 opened, whereby insulation again flows outwardly through the flexible conduit 27 for normal discharge.

Some changes may be made in the construction and arrangement of my method and apparatus for blowing insulation without departing from the real spirit and purpose of my invention, and it is my intention to cover by my claims, any modified forms of structure or use of mechanical equivalents which may be reasonably included within their scope.

I claim:

1. An insulation blowing machine comprising in combination:

means for holding insulation;

insulation agitating means rotatably mounted in said holding means;

a housing connected to said holding means and open thereto and to the atmosphere, said atmospheric opening being adjustable as to size;

a blower having an intake and an outlet, said intake in communication with said housing for receiving insulation mixed with air therefrom;

means connected to said outlet for transmitting said insulation to a point of use; and means operably connected to said transmitting means for reversing the flow of insulation in the discharge end thereof when the point of use is blocked at said discharge end.

2. An insulation blowing machine comprising in combination:

means for holding insulation;

insulation agitating means rotatably mounted in said holding means;

a housing connected to said holding means and open thereto and to the atmosphere, said atmospheric opening being adjustable as to size;

a blower having an intake and an outlet, said intake in communication with said housing for receiving insulation mixed with air therefrom;

conduit means connected at one end to said outlet for transmitting said insulation to a free end thereof which is open to the atmosphere; and means operatively connected to said conduit for simultaneously blocking said conduit intermediate its ends and venting its free end to create a back flow of insulation in the free end of the conduit when said free end is blocked such as by insulation material.

3. An insulation blowing machine comprising in combination:

means for holding insulation;

insulation agitating means rotatably mounted in said holding means;

a housing connected to said holding means and open thereto and to the atmosphere, said atmospheric opening being adjustable as to size;

a blower having an intake and an outlet, said intake in communication with said housing for receiving insulation mixed with air therefrom;

a first conduit connected at one end to said outlet for transmitting said insulation to a free end thereof which is open to the atmosphere;

a second conduit connected at one end to said first conduit and having a free end open to the atmosphere; and means operable in one position to close off said second conduit from the atmosphere, and in another position to close off said first conduit between its connection with said second conduit and said outlet.

4. In an insulation blowing machine having a blower with an outlet for discharging insulation therethrough, apparatus for controlling the movement of the discharged insulation comprising in combination:

a main conduit connected at one end to said outlet and having a free end normally open to the atmosphere;

a by-pass conduit connected at one end to said main conduit and in communication therewith intermediate the ends thereof; and means operatively connected to both conduits and operable in one position to open said main conduit to the passage of insulation therethrough in the portion between its one end and the connection with said by-pass conduit, and to close said by-pass conduit to the passage of insulation therethrough, and operable in another position to close said portion and open said by-pass conduit.

5. In an insulation blowing machine having a blower with an outlet for discharging insulation therethrough, apparatus for controlling the movement of the discharged insulation comprising in combination:

a main conduit connected at one end to said outlet and having a free end normally open to the atmosphere;

a by-pass conduit connected at one end to said main conduit and in communication therewith intermediate the ends thereof;

said main conduit including a flexible portion intermediate its one end and the connection with said by-pass conduit;

said by-pass conduit also including a flexible portion; and means operatively connected to both said flexible portions for sequentially first opening one portion and closing the other portion, and secondly closing the said one portion and opening the said other portion.

6. In an insulation blowing machine having a blower with an outlet for discharging insulation therethrough, apparatus for controlling the movement of the discharged insulation comprising in combination:

a main conduit connected at one end to said outlet and having a free end normally open to the atmosphere;

a by-pass conduit connected at one end to said main conduit and in communication therewith intermediate the ends thereof;

said main conduit including a flexible portion intermediate its one end and the connection with said by-pass conduit;

said by-pass conduit also including a flexible portion;

frame means having a window opening formed therein with an upper and lower end, both said flexible portions extended through said window in a normal open condition; and a slide movably mounted in said frame means for movement through and within the plane of said window, said slide movable between a pair of position selectively closing either one of said flexible conduits, in each position said slide pinching a respective conduit against said frame means at an end of said window opening.

7. In an insulation blowing machine having a blower with an outlet for discharging insulation therethrough, apparatus for controlling the movement of the discharged insulation comprising in combination:

a main conduit connected at one end to said outlet and having a free end normally open to the atmosphere;

a by-pass conduit connected at one end to said main conduit and in communication therewith intermediate the ends thereof;

said main conduit including a flexible portion intermediate its one end and the connection with said by-pass conduit;

said by-pass conduit also including a flexible portion;

frame means including a pair of horizontally spaced plates having horizontally aligned openings therein defining a window and through which said flexible conduits extend in vertically spaced relation; and a slide vertically movable between said plates for partially closing said window, said slide having a pair of spaced openings formed therein through which said conduits extend said spaced openings vertically spaced a distance whereby only one of said flexible conduits remain open in a normal condition in either of a raised or lowered position of said slide, the other of said flexible conduit having been pinched to a closed position against said frame means at an adjacent end of said window.

8. In an insulation blowing machine having a blower with an outlet for discharging insulation therethrough, apparatus for controlling the movement of the discharged insulation comprising in combination:

a main conduit connected at one end to said outlet and having a free end normally open to the atmosphere;

a by-pass conduit connected at one end to said main conduit and in communication therewith intermediate the ends thereof;

said main conduit including a flexible portion intermediate its one end and the connection with said by-pass conduit;

said by-pass conduit also including a flexible portion;

frame means including a pair of horizontally spaced plates having horizontally aligned openings therein defining a window and through which said flexible conduits extend in vertically spaced relation; and a slide vertically movable between said plates, said slide having a pair of spaced openings formed therein separated by a panel having upper and lower edges, each of said conduits extended through one of said spaced openings, the length of said spaced openings and said panel greater than the length of said window, said slide movable between one position with said upper edge slightly above the upper edge of said window and between said plates with one conduit pinched to a closed condition by said slide upper edge between said plates in an inverted V-shape, and with the other conduit in a normal condition, to another position with said one conduit in a normal condition, said lower edge moved to a position slightly below the lower edge of said window with said other conduit pinched to a closed condition by said slide lower edge between said plates in a V-shape.

References Cited by the Examiner
UNITED STATES PATENTS

| 2,434,771 | 1/48 | Mueller | 222—318 |
| 2,550,354 | 4/51 | Jacobsen. | |

SAMUEL F. COLEMAN, *Primary Examiner.*

ANDRES H. NIELSEN, *Examiner.*